(Model.)

W. HECKERT.
Cutter for Forming the Teeth of Gear Wheels.

No. 240,129. Patented April 12, 1881.

WITNESSES:
Theo. F. Hoster
J. Henry Smith

INVENTOR:
Wm Heckert

UNITED STATES PATENT OFFICE.

WILLIAM HECKERT, OF YONKERS, ASSIGNOR OF ONE-THIRD TO B. S. CLARK, OF NEW YORK, N. Y.

CUTTER FOR FORMING THE TEETH OF GEAR-WHEELS.

SPECIFICATION forming part of Letters Patent No. 240,129, dated April 12, 1881.

Application filed March 27, 1880. (Model.)

*To all whom it may concern:*

Be it known that I, WILLIAM HECKERT, of Yonkers, in the county of Westchester and State of New York, have invented a new and useful Improvement in Cutters for Forming the Teeth of Gear-Wheels, of which the following is a full, clear, and exact description, reference being had to the accompanying drawings, forming a part thereof.

My invention relates to improvements in gear-cutting, and is intended to obviate the large number of cutters now required to cut the various pitches of gear-wheels. In the present method of gear-cutting it is necessary to have for each distinctive pitch of teeth a set (eight or more) of cutters for forming the teeth of wheels of such individual pitch. Each of my improved rotary cutters is constructed to cut accurately a variety of pitches. The term "pitch" herein used has reference to what is known as "diametrical pitch."

Figure 1:
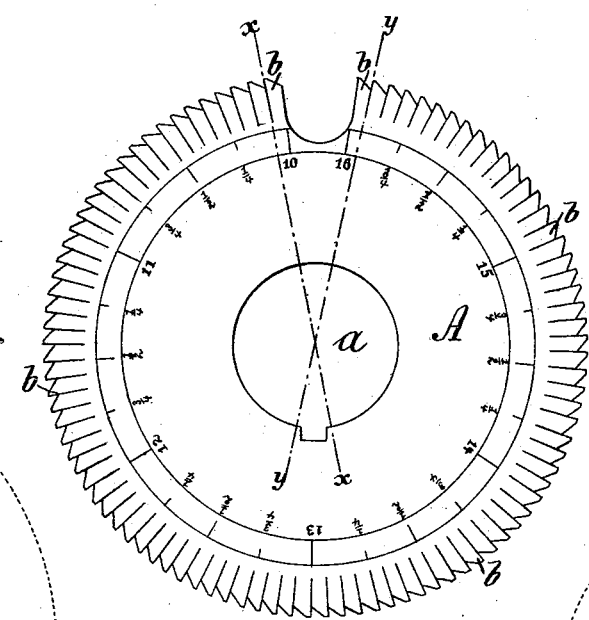
Figure 2:
Figure 3:
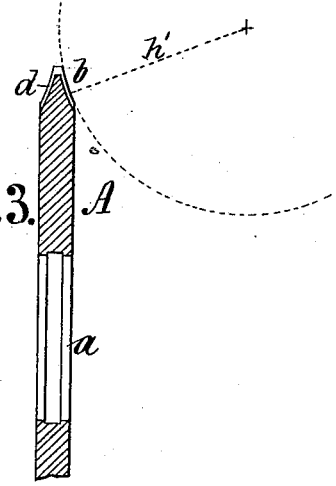
Figure 4:
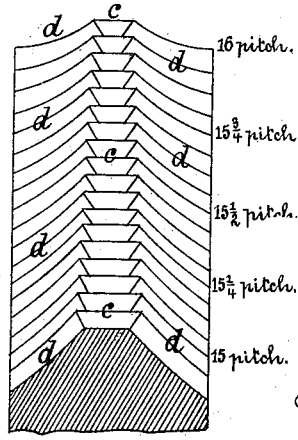

In the accompanying drawings, in which similar letters of reference indicate like parts, Figure 1 is a side view of my improved rotary cutter. Fig. 2 is a sectional view on the lines $x$ $x$ of Fig. 1. Fig. 3 is a sectional view on the lines $y$ $y$ of Fig. 1; and Fig. 4 represents an enlarged partial diagram of the cutter.

A represents the rotary cutter, which is provided with the usual center hole and spline $a$, for receiving the spindle of a gear-cutting machine. On the periphery of rotary cutter A are teeth $b$ formed, which have a uniform increase in size and pitch, and also a respective variation in curvature or shape of teeth to correspond with the variety of pitches represented in such rotary cutter.

One or both sides of cutter A may be provided with a graduation representing the different pitches of gear-wheel teeth which the cutter is capable of producing. This graduation may be in any desired system of measurement—as, for instance, English on one side and metric on the other—by which the operator is enabled to cut teeth of gear-wheels conforming to either measurement with the same cutter.

The rotary cutter, as shown in the drawings, includes all pitches and fractions thereof from ten to sixteen pitch, and is intended to cut all wheels of said pitches from one hundred and thirty-five teeth to a rack. Other cutters with the same pitches are made for cutting wheels of a less number than one hundred and thirty-five teeth, in which cutters the curvature or shape of teeth is changed to correspond with such less number of teeth or diameter of wheel, whereby a set can be made to consist of about eight cutters, which will cut all wheels from twelve teeth to a rack of any pitch represented by such set of cutters. Five or six such sets, embracing coarser and finer pitches, will include all pitches of teeth usually cut.

The dotted line $h$ in Fig. 2 shows the radius from which the curved sides of teeth $b$ of the cutter are formed on the line $x$ $x$, Fig. 1, and the dotted line $h'$ in Fig. 3 shows the radius from which the curved sides of the teeth $b$ of the cutter are formed on the line $y$ $y$ of Fig. 1. It will be noticed that the ninety-six teeth represented on the cutter have a uniform variation in length, and also a uniform variation in curvature, as plainly seen in the partial diagram of cutter A, Fig. 4, where the lines $c$ represent the variation in thickness of teeth on the periphery of cutter A; and the lines $d$ represent the sides of the teeth $b$ with their uniform variation in curvature corresponding with the pitches and all fractional pitches indicated by the graduation on the side of the cutter.

In operating this rotary cutter it is fastened to the spindle of a gear-cutting machine in the usual way. A slight reciprocating motion is given either to the wheel to be cut or to the frame supporting the cutter by a crank or cam, which has a uniform rotation with the cutter, the cutter being placed in contact with the work at the desired pitch, which is given in the graduation at a time when the crank or cam is on its dead-center next to the work, whereby the desired shape of tooth and pitch is produced by such point of cutter, and the remainder of the periphery or part of it is used in removing surplus stock preparatory to the final formation of tooth.

It will be observed that the cutter with its uniform rotary motion is moved toward the blank to be cut by a crank or cam movement during the first part of its rotation until the desired pitch indicated in the graduation has been reached, from which point the cutter is partially withdrawn, causing the periphery or points of teeth to suspend their operation; but the curved sides *d* of teeth *b* continue in contact with the work, removing surplus stock as the cutter is fed forward into the blank to be cut in the usual way.

The full description of a gear-cutting machine on which this cutter is to be used will be the subject of a further application for Letters Patent.

What I claim is—

1. A rotary cutter for forming the teeth of gear-wheels of various pitches, having graduations on its sides representing the various pitches, as and for the purpose specified.

2. A rotary cutter, A, which has on its periphery teeth *b* of a uniform increase in size and pitch, and also a corresponding variation of curvature or shape to conform to the accurate shape of the various pitches as represented by the graduation, as and for the purpose specified.

WILLIAM HECKERT.

Witnesses:
THEODORE G. HOSTER,
J. HENRY SMITH.